United States Patent
Przadka

(10) Patent No.: US 8,559,893 B2
(45) Date of Patent: Oct. 15, 2013

(54) FRONT END MODULE

(75) Inventor: Andreas Przadka, Munich (DE)

(73) Assignee: EPCOS AG, Munich (DE)

( * ) Notice: Subject to any disclaimer, the term of this patent is extended or adjusted under 35 U.S.C. 154(b) by 738 days.

(21) Appl. No.: 12/597,066

(22) PCT Filed: Apr. 22, 2008

(86) PCT No.: PCT/EP2008/054861
§ 371 (c)(1),
(2), (4) Date: Jan. 15, 2010

(87) PCT Pub. No.: WO2008/129044
PCT Pub. Date: Oct. 30, 2008

(65) Prior Publication Data
US 2010/0135193 A1    Jun. 3, 2010

(30) Foreign Application Priority Data
Apr. 23, 2007  (DE) .......................... 10 2007 019 082

(51) Int. Cl.
H04B 1/44    (2006.01)
(52) U.S. Cl.
USPC .......................................................... 455/83
(58) Field of Classification Search
USPC .......................................................... 455/83
See application file for complete search history.

(56) References Cited

U.S. PATENT DOCUMENTS

| 7,164,306 | B2 | 1/2007 | Makino |
| 7,373,171 | B2 | 5/2008 | Nakai |
| 7,459,987 | B2 | 12/2008 | Przadka |
| 2002/0090974 | A1* | 7/2002 | Hagn ............................ 455/552 |
| 2004/0189526 | A1 | 9/2004 | Frank |
| 2004/0209590 | A1 | 10/2004 | Forrester et al. |
| 2004/0224643 | A1 | 11/2004 | Nakai |
| 2005/0197095 | A1 | 9/2005 | Nakamata et al. |
| 2005/0230812 | A1 | 10/2005 | Przadka |
| 2005/0237684 | A1 | 10/2005 | Block et al. |
| 2005/0281210 | A1 | 12/2005 | Makino |
| 2006/0067254 | A1 | 3/2006 | Mahbub et al. |
| 2006/0178122 | A1 | 8/2006 | Srinivasan et al. |

(Continued)

FOREIGN PATENT DOCUMENTS

| DE | 100 53 205 | 5/2002 |
| DE | 103 16 719 | 10/2004 |

(Continued)

OTHER PUBLICATIONS

English translation of Written Opinion for PCT/EP2008/054861 dated Jul. 24, 2008.

(Continued)

*Primary Examiner* — Andrew Wendell
*Assistant Examiner* — David Bilodeau
(74) *Attorney, Agent, or Firm* — Fish & Richardson P.C.

(57) ABSTRACT

A front end module includes an antenna path and a diplexer that is connected to the antenna path, to a first signal path, to a second signal path, and to a third signal path. The first signal path is for transmitting transceiver signals in at least two first frequency bands that are assigned to different transmission systems. The second signal path is for transmitting transceiver signals in at least two second frequency bands that are assigned to different transmission systems. The third signal path is for transmitting reception signals in a third frequency band.

20 Claims, 3 Drawing Sheets

(56) References Cited

U.S. PATENT DOCUMENTS

| | | |
|---|---|---|
| 2006/0194550 A1 | 8/2006 | Block et al. |
| 2007/0126523 A1 | 6/2007 | Przadka |
| 2007/0191055 A1 | 8/2007 | Kovacs et al. |
| 2008/0186106 A1 | 8/2008 | Christian et al. |
| 2008/0238567 A1 | 10/2008 | Rosetti et al. |
| 2009/0212880 A1 | 8/2009 | Przadka |

FOREIGN PATENT DOCUMENTS

| | | |
|---|---|---|
| DE | 103 52 642 | 6/2005 |
| DE | 102004052210 | 6/2005 |
| DE | 102005010773 | 11/2005 |
| DE | 102005020086 | 11/2006 |
| EP | 1 511 184 | 3/2005 |
| EP | 1 601 112 | 11/2005 |
| JP | 2002-141764 | 5/2002 |
| JP | 2002-185356 | 6/2002 |
| JP | 2003-396136 | 11/2003 |
| JP | 2004-007408 | 1/2004 |
| JP | 2004-032673 | 1/2004 |
| JP | 2004-140696 | 5/2004 |
| JP | 2004-266361 | 9/2004 |
| JP | 2005-123910 | 5/2005 |
| JP | 2005-184773 | 7/2005 |
| JP | 2006-086871 | 3/2006 |
| JP | 2006-129419 | 5/2006 |
| JP | 2006-279553 | 10/2006 |
| WO | WO2008/043336 | 4/2008 |

OTHER PUBLICATIONS

International Search Report for PCT/EP2008/054861 dated Jul. 24, 2008.
Written Opinion for PCT/EP2008/054861 dated Jul. 24, 2008.
English Translation of Notification for Reasons of Refusal in JP Application No. 2010-504663, dated Aug. 21, 2012.
Machine Translation of German Publication No. DE102004052210 (Published Jun. 2005).
Machine Translation of Japanese Publication No. JP2002-141764 (Published May 2002).
Machine Translation of Japanese Publication No. JP2002-185356 (Published Jun. 2002).
Machine Translation of Japanese Publication No. JP2004-032673 (Published Jan. 2004).
Machine Translation of Japanese Publication No. JP2004-140696 (Published May 2004).
Machine Translation of Japanese Publication No. JP2004-266361 (Published Sep. 2004).
Machine Translation of Japanese Publication No. JP2005-123910 (Published May 2005).
Machine Translation of Japanese Publication No. JP2005-184773 (Published Jul. 2005).
Machine Translation of Japanese Publication No. JP2006-086871 (Published Mar. 2006).
Machine Translation of Japanese Publication No. JP2006-279553 (Pub. Oct. 2006).
Machine Translation of Japanese Publication No. JP2004-007408 (Pub. Jan. 2004).
Machine Translation of Japanese Publication No. JP2006-129419 (Pub. May 2006).

* cited by examiner

FRONT END MODULE

BACKGROUND

A front end module is known, e.g., from publication DE 103 52 642 A1. One problem to be solved includes disclosing a front end module that allows data transmission in several radio bands.

SUMMARY

Disclosed is a front end module with an antenna path and a diplexer. The diplexer is connected to the antenna path, as well as to a first, second and third signal path. The first signal path is provided for transmitting transceiver signals in at least two first frequency bands that are assigned to different transmission systems. The second signal path is provided for transmitting transceiver signals in at least two second frequency bands that are assigned to different transmission systems. The third signal path is provided for transmitting reception signals in a third frequency band.

The passband of the third signal path may be between the passbands of the first and the second signal path. For example, the first signal path accepts signals in the frequency band between 824 and 960 MHz, the second signal path accepts signals in the frequency band between 1700 and 2170 megahertz, and the third signal path accepts signals in the frequency band between 1574.42 and 1576.42 MHz (GPS band).

In one variation, the diplexer features a low-pass filter that is connected to the first signal path and a high-pass filter that is connected to the second signal path. The high-pass filter and the low-pass filter may each be realized via capacitors and inductors that are electrically interconnected.

Instead of the high-pass filter and/or low-pass filter, it would also be possible, in principle, to use a broadband band-pass filter. The broadband band-pass filter can be realized for example, by suitably interconnecting a low-pass filter and a high-pass filter.

In one variation, the diplexer features a band-pass filter that is connected to the third signal path and may include at least one SAW-filter or BAW-filter.

The front end module may include a supporting substrate and at least one chip that is mounted on the substrate. In one advantageous variation, the diplexer is partially realized in the supporting substrate and partially in the chip. It is additionally possible, in particular, to realize the low-pass filter and the high-pass filter in the supporting substrate and the band-pass filters in the chip or in separate chips. It is also possible to mount at least one circuit element of the low-pass filter or the high-pass filter on the surface of the substrate.

In one variation, the front end module features a first switch that alternately connects the first signal path to at least four first partial paths. The at least four first partial paths include at least two receiving paths, at least one transmitting path and at least one transceiving path.

In one variation, the front end module features a second switch that alternately connects the second signal path to at least four second partial paths. The at least four second partial paths include at least two receiving paths, at least one transmitting path and at least one transceiving path.

The switches may be realized in at least one chip that is mounted on the supporting substrate. Different switches may be realized in separate chips or in one common chip.

The respective transmitting path may be suitable for the data transmission of at least two different transmission systems such as GSM1800 and GSM1900 or, alternatively, GSM850 and GSM900.

A reception filter may be arranged in the respective receiving path, a transmission filter is arranged in the respective transmitting path, and a reception filter is arranged in the third signal path. The transmission filters may be realized in the form of low-pass filters or band-pass filters. The reception filters may be band-pass filters. The band-pass filters may be realized, e.g., in the form of SAW-filters or BAW-filters.

In one variation, a duplexer is arranged in each transceiving path. Each duplexer features a transmission filter and a reception filter. The respective duplexer is used in a CDMA system in one variation and in a WCDMA system in another variation.

The reception filters and/or the transmission filters are realized in at least one chip that is mounted on the supporting substrate. The transmission filters may also be realized in the supporting substrate.

In one variation, a low-noise amplifier is arranged in the respective receiving path and a power amplifier is arranged in the respective transmitting path. The low-noise amplifier is realized in at least one LNA chip that may be mounted on the supporting substrate or integrated into a transceiver chip. The power amplifier is realized in at least one PA chip that may be mounted on the supporting substrate or arranged outside of the module in a separate housing. LNA is the abbreviation for Low Noise Amplifier and PA is the abbreviation for Power Amplifier. It would also be conceivable, in principle, to realize the LNAs and the PAs in a common chip.

The disclosed front end module and its advantageous embodiments are described below with reference to schematic drawings that are not true-to-scale.

DETAILED DESCRIPTION

Figure 1:
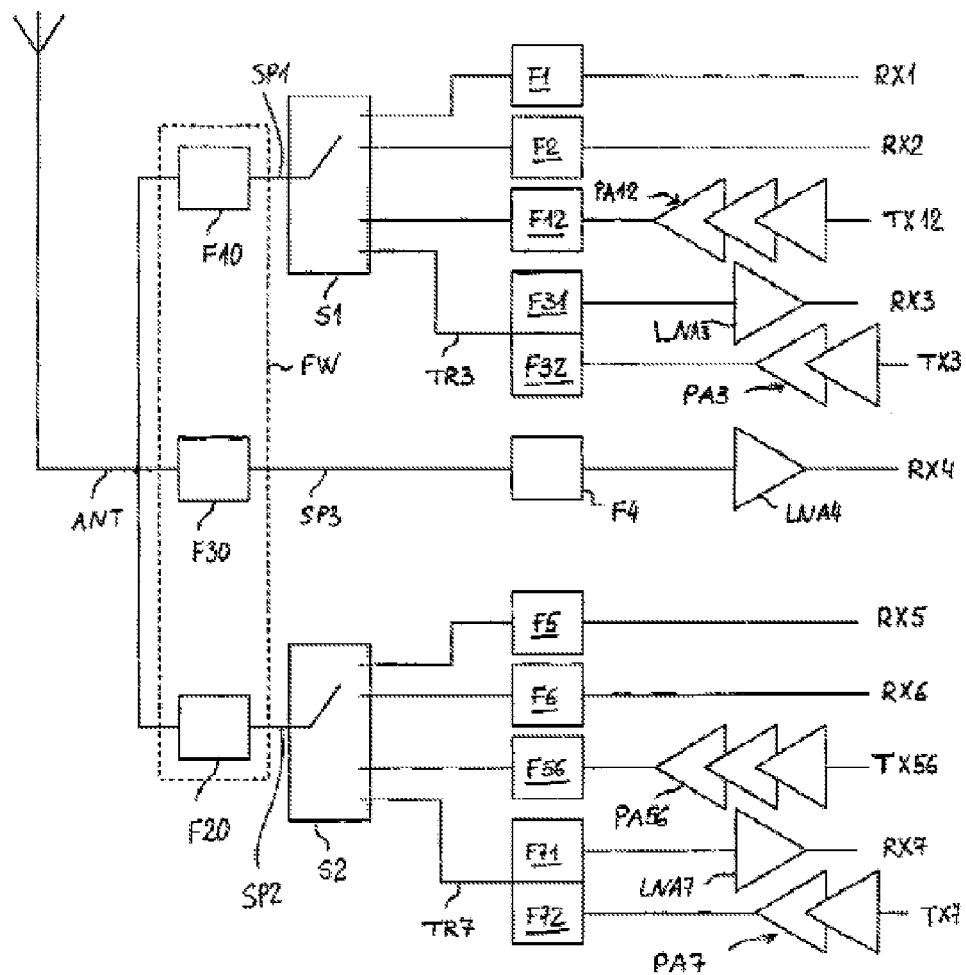
FIG. 1 shows the equivalent circuit diagram of a first front end module.

FIG. 1 shows a front end module with an antenna path ANT and a diplexer FW that is connected to the antenna path. The diplexer FW serves for splitting the antenna path into a first signal path SP1, a second signal path SP2 and a third signal path SP3.

The diplexer FW features a first filter F10 that is arranged in the first signal path, a second filter F20 that is arranged in the second signal path and a third filter F30 that is arranged in the third signal path. The first filter F10 may be a low-pass filter, the second filter F20 may be a high-pass filter and the third filter F30 may be a band-pass filter. The filters F10, F20 and F30 have different passbands. Each filter blocks the passband of the other filters.

The respective filters of the diplexer may be realized in such a way that the first signal path SP1 accepts, for example, signals in the frequency band between 824-960 MHz, the second signal path SP2 accepts signals in the frequency band between 1710-2170 MHz and the third signal path SP3 accepts signals in the GPS-band between 1574.42 and 1576.42 MHz. In a first embodiment, the first and the second filters F10, F20 are realized with the aid of conductors and capacitors. In this case, the third filter F30 is realized in the form of a SAW-filter or a BAW-filter.

The first signal path SP1 is alternately connected conductively to one of the four first partial paths RX1, RX2, TX12 and TR3 by means of a first switch. The second signal path SP2 is alternately connected conductively to one of the four second partial paths RX5, RX6, TX56 and TR7 by means of a second switch. RX paths are receiving paths, TX paths are transmitting paths and TR paths are transceiving paths.

In one variation, the receiving path RX1 is assigned to the GSM850 radio band, the receiving path RX2 is assigned to the GSM900 radio band and the transmitting path TX12 is assigned to the GSM850 and GSM900 radio bands. The transceiving path TR3 is assigned to the CDMA850 radio band. The transceiving path TR3 is split into a transmitting path TX3 and a receiving path RX3 by means of a duplexer. The duplexer is composed of a reception filter F31 and a transmission filter F32. The reception filter F31 is arranged in the receiving path RX3 and the transmission filter F32 is arranged in the transmitting path TX3.

In one variation, the receiving path RX5 of the second signal path SP2 is assigned to the GSM1800 radio band, the receiving path RX6 is assigned to the GSM1900 radio band and the transmitting path TX56 is assigned to the GSM1800 and GSM1900 radio bands. The transceiving path TR3 is assigned to the CDMA1900 radio band. The transceiving path TR7 is split into a transmitting path TX7 and a receiving path RX7 by means of a duplexer. The duplexer is composed of a reception filter F71 and a transmission filter F72. The reception filter F71 is arranged in the receiving path RX7 and the transmission filter F72 is arranged in the transmission path TX7.

The first signal path SP1 is connected to the input of the multipath switch S1 that in a first embodiment features four switchable outputs (SP4T). In the first embodiment, the second signal path SP2 is also connected to the input of another four-way switch S2. The third signal path SP3 is provided as a receiving path RX4, wherein this signal path forms the receiving connection for the GPS-system and is connected to a preamplifier LNA4 of a GPS receiver that is not illustrated in the figure.

The four outputs of the first switch are connected to the reception filter F1 for GSM850, to the reception filter F2 for GSM900, to the low-pass transmission filter F12 for GSM850/900 and the input of the duplexer for CDMA850.

The outputs of the reception filters F1, F2 for GSM850 and GSM900 are then respectively connected to a preamplifier for GSM850 and GSM900. These preamplifiers are not illustrated in FIG. 1. They are arranged, for example, in an integrated circuit (RF-IC) that may also contain other assemblies of the reception circuit such as, e.g., mixers, VCO, preamplifiers of other systems, etc. The low-pass transmission filter F12 for GSM850/900 is connected to the output of a transmission amplifier PA12 for GSM850/900. The reception output of the duplexer F31, F32 is connected to a preamplifier LNA3 for the CDMA850 system. The transmission output of this duplexer is connected to the output of a transmission amplifier PA3 for CDMA850.

The four outputs of the second switch S2 are analogously connected to partial paths, in which filters F5, F6, F56, F71, F72, preamplifiers LNA7, LNA8 and transmission amplifiers PA56, PA7, PA8 for the systems and GSM1800, GSM1900 and CDMA1900 are arranged.

For mobile communications in the CDMA system, the transceiving path TR3 connected to the duplexer input is activated, i.e., conductively connected to the signal path SP1, by means of the switch S1. The GPS signal can still be simultaneously received in the third signal path SP3. This applies analogously to communications in the CDMA1900 system, wherein the second switch S2 is used for connecting the transceiving path TR7 to the signal path SP2 in this case.

For mobile communications in the GSM850 radio band, the first switch S1 alternately switches back and forth between the input of the reception filter F1 for GSM850 and the output of the low-pass transmission filter F12 for GSM850/900, in accordance with the TDD method to be used in the GSM850 standard. TDD is the abbreviation for Time Division Multiple Access and refers to the respective transmission of transmission and reception signals in time slots. This applies analogously to communications in GSM900. This also applies analogously to communications in GSM1800 and GSM1900, wherein the second switch S2 is used in this case.

In one advantageous variation, a single antenna path, i.e., no diversity antenna, is provided in the front end module. The advantage of such a front end module can be seen in that all required radio communication systems are supported and the third signal path is always receive-ready, with a total of only one antenna being used.

Figure 3:
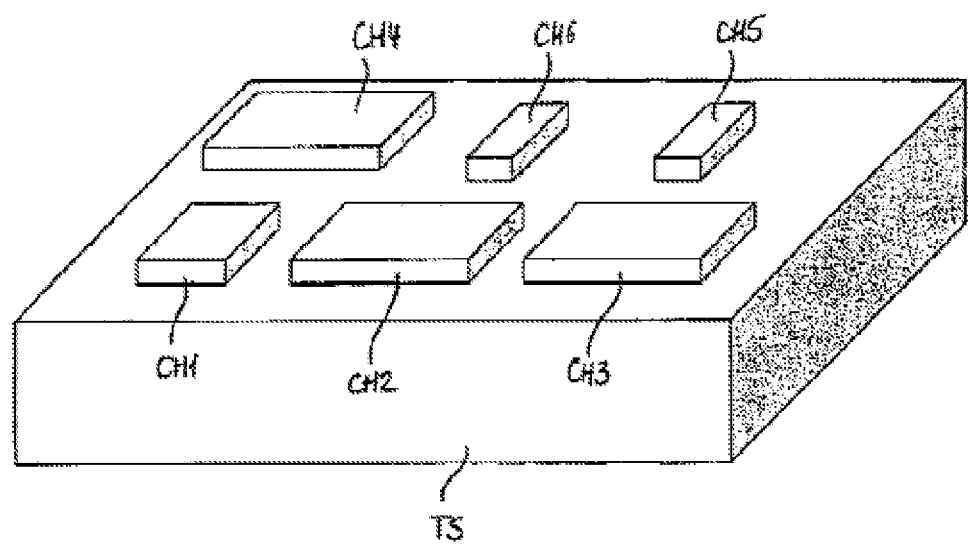
FIG. 3 shows a perspective representation of a frequency module.

The diplexer FW may be partially integrated into a supporting substrate TS that is illustrated in FIG. 3.

The supporting substrate TS preferably features at least two dielectric layers and metallization planes that are arranged alternately with these dielectric layers. The dielectric layers may contain a ceramic material. Consequently, the supporting substrate is referred to below as a multilayer ceramic without loss of generality. The dielectric layers may, however, also contain any other electrically insulating, particularly organic materials or, if applicable, may include such materials exclusively.

The metallization planes are structured such that they form strip conductors or conductive surfaces. Elongated and, optionally, folded strip conductors are suitable for realizing at least one inductor and conductive surfaces are suitable for realizing at least one capacitor. This makes it possible to realize, in particular, the transmission filters F12, F56 and the filters F10, F20.

The front end module may include the following basic blocks: diplexer, switches, reception filters, transmission filters, RF-IC, transmission amplifiers, etc. The basic blocks of the front end module are combined in a compact component that is preferably SMD-compatible. SMD is the abbreviation for Surface Mounted Device.

In a first embodiment (discrete solution), the inductors and capacitors required in the diplexer, e.g., for the filters F10, F20, are integrated into a multilayer ceramic. The filter F30 in the third signal path SP3 that may operate with acoustic waves may be mounted on the surface of the multilayer ceramic in the form of a packaged SMD element or a bare die. This multilayer ceramic serves as a support for, if applicable, packaged switching chips, transmission and reception filters and can be soldered onto the circuit board of the mobile telephone, wherein the electric connections between the front end module and other switching blocks are realized in the circuit board.

Figure 2:
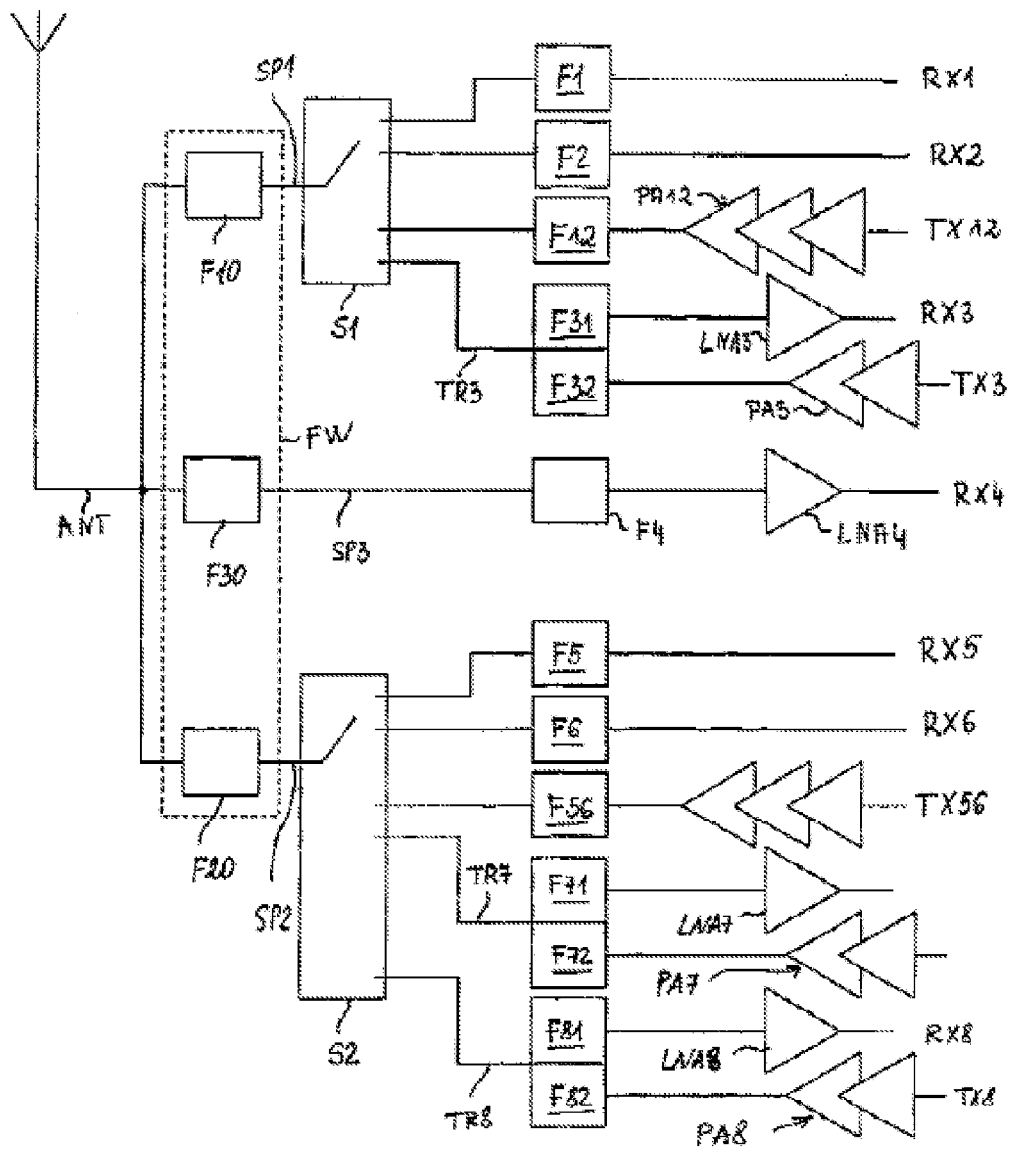
FIG. 2 shows the equivalent circuit diagram of a second front end module.

In a second embodiment that is illustrated in FIG. 2, the inductors and the capacitors of the diplexer, the low-pass transmission filters F12, F56 and adapter elements that may not be illustrated in the figures are integrated into a multilayer ceramic. The adapter elements may serve, e.g., for adapting the input impedance or output impedance of the respective signal path to a predetermined impedance level.

The filter F30 for the third signal path of the diplexer, the two multipath switches S1, S2 and the four reception filters F1, F2, E5, E6 are mounted on the upper side of the multilayer ceramic. In this embodiment, the reception filters may also be realized in the form of SAW filters or BAW filters. In variations of this embodiment, the two switches S1, S2 are respectively realized in the form of a packaged SMD component, a wire-bonded bare die or a flip-chip component.

In a variation that is illustrated in FIG. 3, the reception filters F1, F2 are realized in a common chip CH2. The reception filters F5, F6 are realized in a common chip CH3. The reception filter F4 arranged in the third signal path SP3 is realized in the chip CH1. The switches S1 and S2 may be jointly packaged and arranged in the chip CH4.

The chips CH5 and CH6 feature other components of the front end module, particularly ESD protection components and/or elements of four-wire networks such as, e.g., inductors and capacitors. Inductors realized in chips are characterized by a particularly high quality. Capacitors realized in chips are characterized by a particularly high capacitance.

In a third embodiment (front end module with integrated duplexers), the duplexers are also integrated into the module. In this case, the duplexers feature an acoustic chip or several acoustic chips and, if applicable, adapter elements that are preferably integrated into the multilayer ceramic. The chips may be mounted on the supporting substrate in the form of packaged components or bare dies or in accordance with the flip-chip or wire bonding technology.

In a fourth embodiment, preamplifiers LNA3, LNA7, etc. for the CDMA and WCDMA reception bands also form part of the module. The preamplifiers are also realized in at least one chip that is mounted on the supporting substrate TS.

In a fifth embodiment, four GSM and three WCDMA systems (WCDMA850, WCDMA1900, WCDMA2100) are supported—instead of four GSM and two CDMA systems. This is realized, for example, by changing the order of the switch S2 that is arranged in the high-pass path from SP4T to SP5T as shown in FIG. 2. The passband of the high-pass filter F20 lies in the frequency band between 1710 and 2170 MHz.

It is also possible to support a higher or lower number of GSM, CDMA and WCDMA systems if the order of the switches is adapted accordingly. The front end module can, in principle, be designed for any transmission bands.

In a sixth embodiment, one or more GSM reception filters F1, F2, F5, F6 can be eliminated if a duplexer receiving path is available for the corresponding frequency band. It would be possible, e.g., to eliminate the reception filter F6 assigned to the GSM1900 band if the duplexer for WCDMA1900 is also present in the circuit. In the variation according to FIG. 2, the duplexer for WCDMA1900 is realized with the aid of a reception filter F81 and a transmission filter F82. In this case, a common preamplifier can be used for the reception in GSM1900 and WCDMA1900 communications.

In a seventh embodiment, the reception filters of the duplexers are provided in a differential (balanced) output. Other reception filters or transmission filters may also feature a differential output or input, respectively.

The transition between a single-ended signal path and a differential signal path can be realized by means of a balun. The balun can be integrated into one of the aforementioned filters. A balun functionality can be realized, for example, by means of a DMS track at the output of the respective reception filter or at the input of the respective transmission filter. A balun, the components of which are discretely soldered onto the upper side of the module or integrated into the multilayer ceramic, may also be considered.

The invention claimed is:

1. A front end module comprising:
an antenna path; and
a triplexer that is connected to the antenna path, to a first signal path, to a second signal path, and to a third signal path;
a first switch to connect the first signal path to one of at least four first partial paths;
a second switch to connect the second signal path to one of at least four second partial paths;
a substrate; and
at least one chip that is on the substrate, the triplexer comprising part of the substrate and part of at least one chip on the substrate;
wherein the first signal path is for transmitting signals in at least two first frequency bands that are for different transmission systems;
wherein the second signal path is for transmitting signals in at least two second frequency bands that are for different transmission systems;
wherein the third signal path is for transmitting signals in a third frequency band;
wherein a passband of the third signal path is between passbands of the first signal path and the second signal path;
wherein the triplexer comprises a low-pass filter that is connected to the first signal path and a high-pass filter that is connected to the second signal path;
wherein the triplexer comprises a band-pass filter that is connected to the third signal path;
wherein the high-pass filter comprises a capacitor and an inductor that are electrically connected, and the low-pass filter comprises a capacitor and an inductor that are electrically connected; and
wherein the band-pass filter comprises a surface acoustic wave (SAW) filter or a bulk acoustic resonator (BAW) filter.

2. The front end module of claim 1, wherein the at least four first partial paths comprise at least two receiving paths, at least one transmitting path, and at least one transceiving path.

3. The front end module of claim 1, wherein the at least four second partial paths comprise at least two receiving paths, at least one transmitting path, and at least one transceiving path.

4. The front end module of claim 2, wherein the at least one transmitting path is for transmitting data for at least two different transmission systems.

5. The front end module of claim 2, wherein a reception filter is in each receiving path;
wherein a transmission filter is in each transmitting path; and
wherein a reception filter is in the third signal path.

6. The front end module of claim 5, wherein reception filters and transmission filters comprise parts of at least one chip that is mounted on the substrate.

7. The front end module of claim 2, wherein a duplexer is in each transceiving path.

8. The front end module of claim 7, wherein each duplexer comprises part of at least one chip that is on a substrate.

9. The front end module of claim 1, wherein the first and second switches comprise parts of at least one chip that is on the substrate.

10. The front end module of claim 2, wherein a preamplifier is in each receiving path;
wherein a power amplifier is in each transmitting path;
wherein each preamplifier comprises part of at least one LNA chip that is on the substrate; and wherein each power amplifier comprises part of at least one PA chip that is on the substrate.

11. A front end module comprising:
a triplexer that is connectable to an antenna path, to a first signal path, to a second signal path, and to a third signal path;
a first switch to connect the first signal path to one of at least four first partial paths, at least some of the four first partial paths comprising first amplifiers;
a second switch to connect the second signal path to one of at least four second partial paths, at least some of the four first partial paths comprising second amplifiers;
wherein the front end module is a component that is surface-mountable;
wherein the first signal path is for transmitting signals in at least two first frequency bands that are for different transmission systems;
wherein the second signal path is for transmitting signals in at least two second frequency bands that are for different transmission systems;
wherein the third signal path is for transmitting signals in a third frequency band;
wherein a passband of the third signal path is between passbands of the first signal path and the second signal path;
wherein the triplexer comprises a low-pass filter that is connected to the first signal path and a high-pass filter that is connected to the second signal path;
wherein the triplexer comprises a band-pass filter that is connected to the third signal path;
wherein the high-pass filter comprises a capacitor and an inductor that are electrically connected, and the low-pass filter comprises a capacitor and an inductor that are electrically connected; and
wherein the band-pass filter comprises a surface acoustic wave (SAW) filter or a bulk acoustic wave (BAW) filter.

12. The front end module of claim 11, wherein the at least four first partial paths comprise at least two receiving paths, at least one transmitting path, and at least one transceiving path.

13. The front end module of claim 11, wherein the at least four second partial paths comprise at least two receiving paths, at least one transmitting path, and at least one transceiving path.

14. The front end module of claim 12, wherein the at least one transmitting path is for transmitting data for at least two different transmission systems.

15. The front end module of claim 12, wherein a reception filter is in each receiving path;
wherein a transmission filter is in each transmitting path; and
wherein a reception filter is in the third signal path.

16. The front end module of claim 15, wherein reception filters and transmission filters comprise parts of at least one chip that is mounted on a substrate.

17. The front end module of claim 12, wherein a duplexer is in each transceiving path.

18. The front end module of claim 17, wherein each duplexer comprises part of at least one chip that is on a substrate.

19. The front end module of claim 11, wherein the first and second switches comprise parts of at least one chip that is on a substrate.

20. The front end module of claim 12, wherein a preamplifier is in each receiving path;
wherein a power amplifier is in each transmitting path;
wherein each preamplifier comprises part of at least one LNA chip that is on a substrate; and
wherein each power amplifier comprises part of at least one PA chip that is on the substrate.

* * * * *